MULTI-COLLECTOR TRANSISTOR FORMING BISTABLE CIRCUIT

Original Filed Aug. 19, 1960 2 Sheets-Sheet 1

INVENTOR
JOHN EARLE

BY Ray C. Hoggard
ATTORNEY

MULTI-COLLECTOR TRANSISTOR FORMING BISTABLE CIRCUIT

Original Filed Aug. 19, 1960 2 Sheets-Sheet 2

United States Patent Office

Re. 25,978
Reissued Mar. 8, 1966

25,978
MULTI-COLLECTOR TRANSISTOR FORMING BISTABLE CIRCUIT

John Earle, Wappingers Falls, N.Y., by International Business Machines Corporation, New York, N.Y., a corporation of New York, assignor to International Business Machines Corporation, New York, N.Y., a corporation of New York

Original No. 3,134,026, dated May 19, 1964, Ser. No. 50,682, Aug. 19, 1960. Application for reissue Nov. 12, 1964, Ser. No. 425,981

6 Claims. (Cl. 307—88.5)

Matter enclosed in heavy brackets [ ] appears in the original patent but forms no part of this reissue specification; matter printed in italics indicates the additions made by reissue.

This invention relates to electronic trigger circuits and more particularly to such circuits which utilize multi-collector transistors.

Of primary importance to the modern digital computer are its switching circuits. Generally, these switching circuits have taken the form of electronic triggers. An electronic trigger is an electrical circuit which is capable of existing in more than one stable state for a fixed value of supply voltages and circuit parameters. External stimulation, usually, in the form of electronic pulses, forces the circuit to change rapidly from one of its stable states to another. Such pulse is said to "trigger" the circuit.

One of the most fundamental of these electronic triggers is the Eccles-Jordan circuit or, as it is commonly referred to, the flip-flop. Basically the flip-flop has heretofore consisted of two triodes, the anode output of each being fed to the grid input of the other in such a manner that the circuit is capable of existing in either one of two stable states. By applying pulses to the grids of the tubes the flip-flop can be "flipped" from one stable state to the other. Other switching circuits which have found wide application in the computer arts are the binary trigger and the shift register.

In recent years the switching circuits of the modern computer have been subjected to constant modifications by design engineers to increase their compactness and speed of operation. These attacks have been largely premised upon the philosophy that all that is needed is to build the present day circuits smaller and faster. Thus, with this methodology, compactness has been achieved by the substitution of transistors and printed circuitry for their bulkier counterparts; speed has been gained by the reduction of the capacitance and inductance of the sockets and leads connecting the individual elements. The result has been the same basic circuit of a decade ago built smaller and faster.

But as the demand for speed and compactness continues to grow, the present day switching circuits of the computer are rapidly approaching the point of diminishing returns. Compromises must be made continuously between the demands made and the goals attainable. It has become apparent that the substitutional methodology of the past has reached the peak of its effectiveness.

It is accordingly, the principal object of the present invention to provide faster and more compact switching circuits which utilize a new circuit element and design philosophy.

Another object of the present invention is to provide new and novel electronic trigger circuits.

The present invention achieves its goal of speedier and more compact switching circuits by providing a series of electronic trigger circuits which have the effect of compressing many switching functions into a single circuit arrangement. Previously, performance of these functions necessitated separate circuits into a single circuit arrangement. This compression is possible through the use of a recently developed multi-collector transistor. By controlling the collectors of the device, this single circuit element can be made to perform complex switching operations in a relatively short time.

The invention consists generally of one or more transistors, each having a base, an emitter and a plurality of collectors. A current source is connected to each emitter, and means are coupled to the current source to control the amount of current which enters the emitter. Feedback means are provided to give the circuit its requisite multi-stable character.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
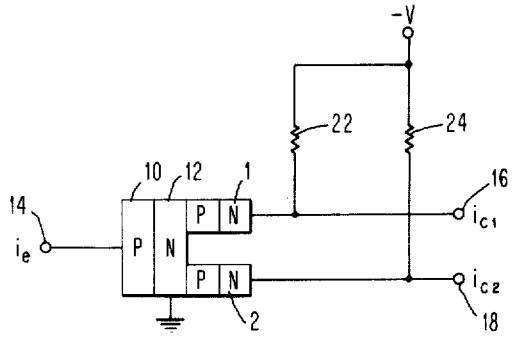
FIG. 1 is a schematic diagram of a circuit used to obtain the transfer characteristics of the two-collector version of the multi-collector transistor.

The multi-collector transistor illustrated in FIG. 1 has been the result of recent experimental investigations on the interaction of multiple collectors on a common semiconductor substratum. By way of example, a two-collector transistor is illustrated. It consists generally of two PN-type collectors 1 and 2 positioned so as to operate on the large-area junction between the P-type emitter 10 and the N-type base 12. A similar NPNP-type structure has also been shown to be possible.

In order to obtain the transfer characteristics of the multi-collector transistor the circuit of FIG. 1 is utilized. The base 12 is grounded and suitable biasing voltages are provided for the collectors 1 and 2 by means of the voltage divider network consisting of resistors 22 and 24. Emitter current ($i_e$) is introduced to the transistor through the terminal 14 and the resulting collector currents ($i_c$) are taken from the terminals 16 and 18. The current resulting at collector 1 is designaed $i_{c1}$, and that at collector 2 as $i_{c2}$.

Figure 2:
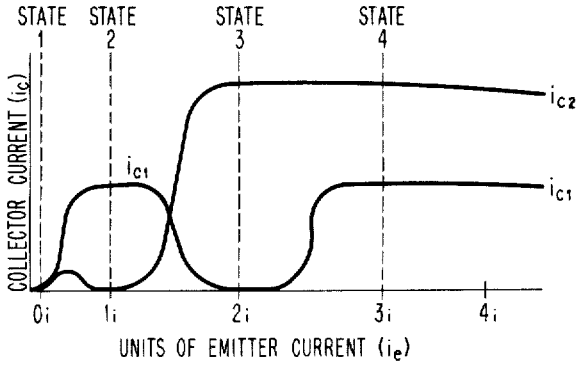
FIG. 2 is a graphic representation of the emitter-collector transfer characteristics of the transistor resulting from the operation of the circuit in FIG. 1.

The emitter-collector transfer characteristics of this two-collector transistor operated in the circuit of FIG. 1 are shown in graphical form in FIG. 2. Emitter current ($i_e$) is the abscissa and is plotted in units. One unit of emtter current is defined as that increment of current necessary to switch the collectors from one state to another. Collector current ($i_c$) is plotted as the ordinate.

The operation of the two-collector transistor may be observed from the curves of FIG. 2. As is there resignated, there are four possible steady state conditions in which the transistor may find itself. These are: state 1 where neither collector is conducting; state 2 where collector 1 is conducting and collector 2 is not; state 3 where collector 2 is conducting and collector 1 is not; and state 4 where both collectors are conducting.

Starting in state 1, neither collector is conducting. As the emitter current is increased, collector 1 becomes saturated and the transistor is now in state 2. When the emitter current is increased beyond the value needed to saturate collector 1, the current will go to collector 2. As the current further increases, the electric field near collector 2 becomes strong enough to begin to divert some of the current originally going to collector 1. For still further increases, this diversity or "robbing" action becomes stronger and finally collector 2 collects essentially all of the injected current and is driven to saturation. At the same time, collector 1 is collecting no emitter current and is in the "off" condition. The transistor is not in state 3. Any additional current introduced after the second collector is in saturation will be collected by collector 1 and it, too, will again be saturated upon acquiring the necessary current. This is state 4 when both collectors are conducting.

One additional characteristic of the two-collector transistor which has made possible the circuits described below can also be noted from the graph of FIG. 2. The transistor has the unique ability consistently to turn "on" faster than it turns "off." The graph shows that when the transistor is going from state 2 to state 3, collector 2 will begin conducting before collector 1 has [which are to follow, this characteristic is extremely imcompletely ceased conducting. In the feedback circuits portant] *completely ceased conducting. In the feedback circuits which are to follow, this characteristic is extremely important.*

Figure 3:
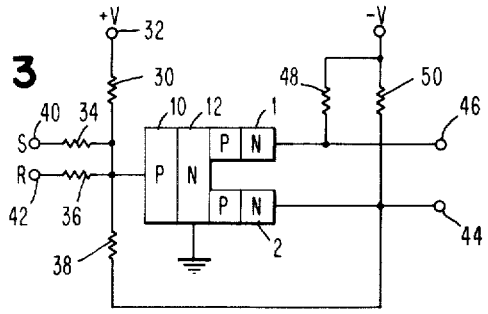
FIG. 3 is a schematic circuit diagram of a flip-flop circuit utilizing the multi-collector transistor.

The basic trigger circuit of the present invention is illustrated in FIG. 3. There the two-collector transistor and its associated circuitry is operated as a D.-C. flip-flop. The transistor has an emitter 10, a base 12, and collectors 1 and 2. Connected to the emitter 10 is a current source in the form of a resistor 30 and a positive voltage source introduced through the terminal 32. The value of the resistor 30 is chosen so that it allow passage of a certain number of units of current.

Connected to the current source are a plurality of current drains or sinks in the form of resistors 34, 36 and 38.

These current drains provide a means for controlling the amount of current which will be introduced into the emitter from the source. Resistors 34 and 36 are connected to terminals 40 and 42 and provide the inputs for the flip-flops. Resistor 38 is connected in a feedback arrangement to the terminal 44 of the output. The value of each of the resistors 34, 36 and 38 is chosen so that each resistor will drain a certain number of the units of current introduced by the current source and thus prevent such current from entering the emitter 10. This drainage occurs when the terminals of the respective resistors are at —V volts. No such drainage occurs when the terminals are at ground or 0 volts. Suitable biasing voltage is applied to the collectors 1 and 2 by means of the voltage divider network consisting of resistors 48 and 50. The output of the flip-flop is taken from the terminals 44 and 46.

As is well known, the logic in digital computers is accomplished by the use of the binary number system. In the binary system, based upon a radix of two instead of a radix of ten as in the decimal number system, only two numbers, zero and one, are required to represent all other numbers. These binary numbers of zero and one are represented electrically by means of electrical voltages. The more positive of the voltages is used to represent binary or logical one; the more negative to represent binary or logical zero.

Since the trigger circuits of the present invention have particular usage in digital computers, they must respond to this binary notation if they are to be effective switching elements. This necessitates that the inputs and outputs of these devices be in the binary notation. In the circuits of the present invention, ground or 0 volts will represent binary or logical one and —V volts will represent binary zero. This in effect means that the inputs and outputs of the circuits of this invention will swing between logical one and logical zero.

With this background it is now possible to understand the operation of the circuit of FIG. 3. Assume that the value of resistor 30 is such as to permit 3 units of current to pass and the resistors 34, 36 and 38 are each of a value which will drain one unit of current when their respective terminals are at logical zero (—V volts). Since a flip-flop is a circuit capable of existing in two stable states, further assume that the circuit of FIG. 3 is in the first of its stable states with the following conditions: terminal 46 is at logical one (0 volts), terminal 44 at logical zero (—V volts), input terminal 40 is at logical zero (—V volts) and terminal 42 is at logical one.

When the conditions are such, terminals 40 and 44 will each drain one unit of current, leaving one unit from the source to enter the emitter. From the graph of FIG. 2 it is seen that one unit of emitter current will place the transistor in state 2 with collector 1 conducting and collector 2 not conducting. This accounts for the output of this first stable state being logical one at terminal 46 and logical zero at terminal 44.

Switching the flip-flop from one stable state to the other is accomplished by the application of triggering pulses at the input terminals 40 and 42. The flip-flop is switched from the stable state above described to its other stable state by the application at the terminal 40 of a pulse going from —V volts to ground, or expressed in binary notation, a pulse going from logical zero to logical one. When the pulse is applied, the voltage at the terminal will rise almost instantaneously to ground. This will allow another unit of current to go to the emitter 10 and will means that now two units of emitter current are present. These two units of current will tend to start collector 2 conducting and shut off collector 1. But as is seen from FIG. 2, collector 2 begins conducting before collector 1 ceases. As soon as collector 2 starts conducting, the unit of current which resistor 38 previously drained will now go to the emitter. This will means that there are now three units of emitter current which will allow both collectors to conduct. Thus, both the terminals 44 and 46 are at logical one (ground). This state is stable as long at terminal 40 is at logical one and is a transition state for the flip-flop.

When the voltage at the terminal 40 returns to logical zero at the termination of the pulses it will again drain one unit of emitter current leaving two units of current to enter the emitter. Two units of emitter current will allow collector 2 to conduct and turn off collector 1. Thus, the terminal 44 remains at logical one while the terminal 46 goes to logical zero. This is the second stable state of the flip-flop and the terminals 44 and 46 are now the exact opposite of what they were in the first stable state. The flip-flop has been set and for this reason the terminal 40 is called the set-terminal and is designated by the letter S.

In order to return the flip-flop to its original stable state a pulse going from ground to —V volts is applied at the terminal 42. In other words the terminal 42 is brought from logical one to logical zero. When the pulse is applied the voltage at the terminal will instantaneously go to —V volts and the terminal will drain another unit of current. Since terminals 40 and 44 are also both at logical zero, all three units of current are drained leaving no emitter current. This will result in collector 1 going to its non-conductive state and both terminals 44 and 46 will be at logical zero. This is the transition state of the flip-flop.

When the terminal 42 returns to logical one at the expirtation of the pulse, only terminals 40 and 44 will drain current from the source. This will leave one unit of emitter current to bring collector 1 to it conductive state. The flip-flop has not returned to its original state with terminal 46 at logical one and terminal 44 at logical zero. The flip-flop has thus been reset to its original state and the terminal 42 may be called the Reset terminal. For this reason it is designated by the letter R.

Note that applying simultaneous pulses to both the Set and Reset terminals does not affect the flip-flop, since the one unit drain required by the Reset terminal is supplied by the Set terminal.

The circuit of FIG. 3 forms the basic structure from which a great number of logically different flip-flop circuits can be constructed. The circuits which result from such interpolation fall into two general classes. The first class consists of those circuits whose parameters are such as to be capable of oscillation under particular conditions. Theses circuits are called A.-C. flip-flops. The second class consists of those circuits whose configurations and parameters will not permit oscillatory operation. These are called D.-C. flip-flops.

Since oscillations are undesired in flip-flop operation, the circuits of the first class require that the width of the input pulses be less than the oscillation period of the circuit. This is generally accomplished by the use of a positively clamped differentiating network at the input.

Figure 4:
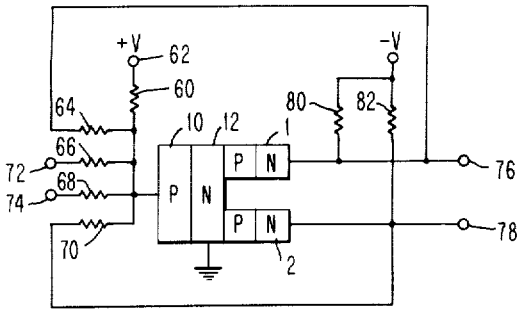
FIG. 4 is a circuit diagram of another form of flip-flop circuit.

FIG. 4 illustrates the circuit configuration of a typical A.-C. flip-flop. The transistor has collectors 1 and 2, emitter 10 and a grounded base 12. Connected to the emitter is a current source consisting of resistor 60 and a positive voltage introduced through the terminal 62. A plurality of current drains or sinks in the form of resistors 64, 66, 68 and 70 are connected to the current source. The resistors 66 and 68 are connected to the terminals 72 and 74 and form the inputs to the device. Resistor 64 is connected in a feedback arrangment with the output terminal 76 of collector 1. Similarly resistor 70 is connected in a feedback loop with the output terminal 78 of collector 2. Suitable biasing voltages are provided for the collectors by means of the voltage divider network of resistors 80 and 82.

The value of resistor 60 is chosen so that when the terminal 62 is at +V volts the resistor will allow passage of a certain number of units of current. Each of the resistors 64, 66, 68 and 70 is chosen so that it will drain a certain number of units of current when their respective terminals are at −V volts. No such drainage will occur when the terminals are at ground or 0 volts.

One of the many circuits which may be constructed of this basic format is one wherein resistor 60 will allow four units of current to pass; resistors 64 and 66 will each drain two units of current under proper conditions and resistors 68 and 70 will each drain one unit of current when their terminals are at logical zero.

The operation of this circuit as a flip-flop will now be demonstrated. Assume that in the steady state the terminal 72 is at logical one and the terminal 74 is at logical zero. This will result in an output of logical zero at both the terminals 76 and 78. If a positive pulse were applied at the terminal 74 so as to bring it to logical one, it would mean that the resistors 64 and 70 would be the only drains on the current source and would leave one unit of current to enter the emitter and bring collector 1 to logical one. At the termination of the pulse the terminal 74 would again return to logical zeros. This would leave two units of current to enter the emitter, tending to turn collector 1 off and collector 2 on. But collector 2 turns on much faster than collector 1 turns off and as it does, it allows another unit of current to enter the emitter, thus holding collector 1 on. Now both collector 1 and collector 2 are at logical one. This is the second stable state and the flip-flop is now set.

In order to return the flip-flop to its original state the terminal 72 must be pulsed to bring it to logical zero. A similar circuit analysis will show that the collector 1 and 2 at the termination of the pulse will both return to their original state of logical zero. The flip-flop will then be reset.

It should now be apparent that the operation of these circuits can be very materially altered by charging the circuit parameters, particularly the values of the current source and drains. Thus in the circuit configuration of FIG. 4 if the value of the current source were altered to 3 units and each of the current drains would drain one unit under proper conditions, an entirely different circuit operation would ensue. In this manner any number of logically different circuit operations can be obtained from the basic structure. In fact the circuit parameters will often determine whether the circuit will operate in an A.-C. or a D.-C. fashion. The circuit configuration of FIG. 5 is an example.

Figure 5:
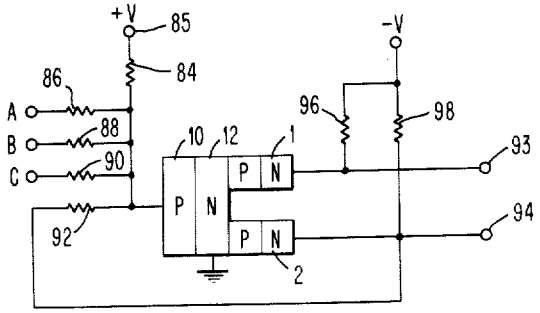
FIG. 5 is a schematic diagram of yet another flip-flop arrangement.

The circuit of FIG. 5 is very similar to that of FIG. 4 with the one exception that it has only one feedback loop. The transistor has connected to its emitter 10 three input terminals A, B, C coupled to current drains provided by resistors 86, 88 and 90. A positive voltage source is introduced through the terminal 85. An additional current drain is provided by the feedback loop connecting resistor 92 to the output terminal 94 of collector 2. The voltage divider network of resistors 96 and 98 provide the bias for the collectors.

One of the methods in which to operate the circuit of FIG. 5 in an A.-C. manner requires that the parameters have the following values: resistor 84 will allow 4 units of current to pass, resistor 86 will drain 3 units of current, resistors 88, 90 and 92 will each drain one unit of current. A stable state in which this circuit may find itself is when the terminal A is at logical one, the terminals B and C both at logical zero, the output terminal 93 at logical one, and the terminal 94 at logical zero. If now the terminal C is pulsed to bring it to logical one, this will mean that only terminal C and terminal 94 will drain current. This will leave two units of current to enter the emitter and attempt to turn collector 1 off and collector 2 on. But, as was noted previously, collector 2 will turn on faster than collector 1 will turn off, with the result that the one unit drain previously existing at terminal 94 will now be abated and three units of current will enter the emitter, turning both collectors on. When the pulse terminates, the terminal C will return to logical zero. In this condition two units of current from the source will enter the emitter, resulting in collector 2 remaining on and collector 1 being turned off. This is the second stable state for this circuit.

A similar circuit analysis will show that by pulsing the terminal A to bring it to logical zero, the circuit will return to its original state with collector 1 on and collector 2 off. It should be noted that even with the required pulse-width control necesary for A.-C. flip-flop, that this circuit will oscillate for the pulse input combination of terminals A and B at logical one and terminal C at logical zero. Such oscillations are undesired in the flip-flop mode of operation and hence should be avoided.

A method of operating the circuit of FIG. 5 as a D.-C. flip-flop, presupposes the following circuit parameters: resistor 84 will allow three units of current, resistor 86 to drain two units of current and resistors 88, 90 and 92 each to drain one unit of current. One of the steady states in which the circuit may find itself requires the following conditions present: terminal A and B at logical one, terminal C at logical zero, collector 1 at logical one, collector 2 at zero. Following a circuit analysis similar to that already described it can be seen that pulsing terminal C will bring the flip-flop to the second of its stable states with collector 1 at logical zero and collector 2 at one. Pulsing terminal A will bring the flip-flop back to its original state.

The circuit parameters utilized above to illustrate the modes of operation of the various circuits are merely examples of a large number of bistable flip-flops which can be synthesized from the basic structure. It must not be thought, however, that these circuits differ only in the values of the current sources and drains. Their modes of operation, their switching characteristics and their potential for performing combinational logic all differ widely.

Figure 6:
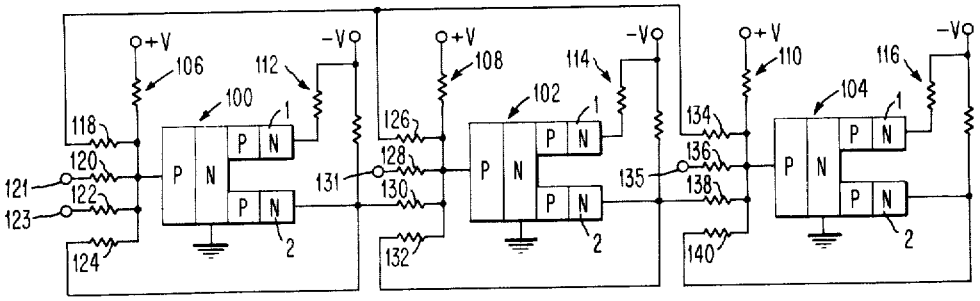
FIG. 6 is a circuit diagram of a shift register utilizing the multi-collector transistor.

The basic single sequential circuits described above can with facility be interpolated upon being combined together to form very useful multi-sequential circuits. An example resulting from such interpolation is the shaft-register of FIG. 6. The circuit consists essentially of three transistors 100, 102 and 104 each connected in a flip-flop arrangement. Each transistor has connected to its emitter a current source designated generally as 106, 108 and 110. Biasing voltages are provided for the collectors by means of the voltage divider networks 112, 114 and 116. Four current drains are provided for each of the transistors. Transistor 100 has as its drains resistors 118, 120, 122 and 124. Resistors 120 and 122 together with terminals from the inputs 121, 123 for the first transistor. [Resistor 118 is arranged in feedback relationship with the other similarly situated resistors of the other transistors. Resistor 122 is in feedback arrangement with the output of collector 2 of tranistor 100.

Transistor 102 also has four current drains in the form of resistors 126, 128, 130 and 132. Resistor] *Resistor 118 is a reset signal input resistor which is connected in parallel with the other similarly situated reset resistors of the other transistors. Resistor 124 is in feedback arrangement with the output of collector 2 of transistor 100.*

*Transistor 102 also has four current drains in the form of resistors 126, 128, 130 and 132. Reset resistor* 126 is connected to the similarly situated resistors of the other transistors. Resistor 132 is connected to the output of collector 2 of transistor 102 and resistor 130 is connected to the output of collector 2 of transistor 100. Resistor 128 together with terminal 131 forms the input to transistor 102.

The arrangement of resistors 134, 136, 138 and 140 of transistor 104 is identical to that of transistor 102.

The following circuit parameters produce satisfactory operation of the shift register. Each of the current sources 106, 108 and 110 is valued at 3 units of current; each of the resistors 118, 120, 126, 128, 134, 136 is valued at 2 units of current; each of the resistors 122, 124, 130, 132, 138 and 140 is valued at one unit of current.

[To illustrate the operation of the device under these parameters, the terminal 121 is at logical one, terminal 123 at logical zero. This results in collector 1 of transistor 100 being at logical zero and collector 2 at logical one. Terminal 131 is at logical zero, collector 1 and collector 2 of transistor 102 both at logical zero. Terminal 135 is at logical one, collector 1 of transistor 104 at logical one and collector 2 at logical zero.]

[If now the terminals 121 and 135 are pulsed to bring them to logical zero and terminal 131 pulsed to bring it to logical one, this would result in transistor 100 tending to turn both collectors to logical zero. At this same instant, transistor 102 will instantaneously have three units of emitter current tending to turn both collectors on. As was stated the two-collector transistor has the property of urning on faster than it turns off. Since resistor 130 of transistor 102 is connected to the output of collector 2 of transistor 100, this property of the transistor will materially affect the operation of the circuit at this time. Thus, transistor 102 will initially have collectors 1 and 2 both conducting and at logical one. When, at a short time later transistor 100 has turned off, there will be a one unit drain of current on transistor 102 through resistor 130. This will result in the returning of collector 1 of transistor 102 to logical zero. The application of the pulse at terminal 135 will result in transistor 104 being totally shut off and thus, both collectors at logical zero.]

[At the termination of the pulse the terminals will return to their original state and by a similar operation the circuit will transfer the information of transistor 102 to transistor 100.]

*To illustrate the operation of the device under these parameters, let us assume that terminal 120 is at logical one, terminal 122 is at logical zero, terminal 131 is at logical zero, and terminal 135 is at logical one. Terminal 123 is the information input terminal and terminals 121, 131 and 135 are the shift input terminals. It will be noted that the shift input is complemented at each succeeding stage of the register. The reason for this will be apparent from the detailed description which follows.*

*With the foregoing input conditions, a logical zero is applied to the reset resistors 118, 126 and 134, which drains 2 units of current from each of the current sources 106, 108, 110. This places both collectors of all three transistors at logical zero, since the third unit of current will be drained through feedback resistors 124, 132, and 140. If collector 2 happens to be at logical one when the reset pulse is applied, the third unit of current will initially drain through the transistor instead of the feedback resistor, but this will cause collector 2 to switch from a logical one to a logical zero, which will switch the current from the transistor to the feedback resistor. Thus the application of reset pulse will reset all of the collectors to logical zero regardless of their prior state.*

*When the rest pulse passes, transistor 100 will be set to its first state by the zero input to terminal 123, i.e. collector 1 of transistor 100 will switch to logical one and collector 2 will remain at logical zero. This occurs because one unit of current drains through resistor 123 and one unit through resistor 124, leaving one unit of current to drain through transistor 100. Transistor 102, however, will remain in its reset state because of the complementary shift input to terminal 131, which allows 2 units of current to drain through resistor 128. Transistor 104 will adopt the same state as transistor 100 for the same reasons.*

*To shift the input information down the register, the input to the shift input terminals 121, 131 and 135 is complemented and then returned to its original condition. Transistors 100 and 104 get reset to zero when the shift input is complemented, and then get set to the state indicated by their respective signal input terminals when shift input returns to its original state. Transistor 104, however, gets set to the state indicated by its input signal when the shift input is complemented, and then gets reset to zero when the shift input returns to its original state. This means that the information stored in transistor 100 will be shifted into transistor 102 when the shift input is complemented, and then shifted from transistor 102 to transistor 104 when the shift input returns to its original state. At the same time, transistor 100 will receive a new unit of information.*

*To verify the details of this shifting process, it should be sufficient to note that switching the shift input terminals 121 and 135 from logical one to logical zero is equivalent to applying a reset pulse, since resistors 120, 128 and 136 each drain 2 units of current, and that switching shift input terminal 131 from logical zero to logical one is equivalent to terminating a reset pulse.*

*In summary, sequential binary signals are applied to input terminal 123 of the above described shift register and shifted two stages down the register by each shift input pulse, which comprises complementing the shift input to each stage and then returning it to its original condition. The output appears as sequential binary signals on the collectors of the last stage of the shift register. It will be apparent that the circuit of FIG. 6 can be cascaded if desired to increase the capacity of the shift register.*

Figure 7:
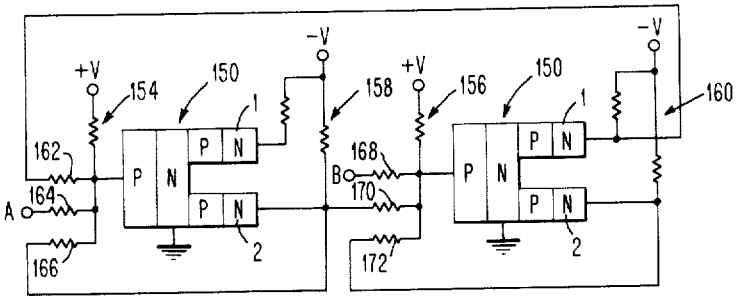
FIG. 7 is a schematic diagram of the multi-collector transistor utilized in a D.C. binary trigger circuit.

Another multi-sequential circuit which may be constructed by interpolating upon and combining together the basic circuit is the binary trigger circuit of FIG. 7. The circuit consists of two two-collector transistors 150 and 152, with suitable current sources 154 and 156 and biasing means 158 and 160. Connected to the current source 154 and the emitter of transistor 150 are three current drains in the form of resistors 162, 164 and 166. Resistor 164 together with terminal A forms the input terminal to the transistor 150 while resistor 162 is connected in feedback arrangement to the output of collector 1 of transistor 152. Resistor 166 is connected in feedback arrangement with the output of collector 2 of transistor 150.

In similar manner transistor 152 has connected to its emitter and current source 156, three current drains or sinks in the form of resistors 168, 170 and 172. Resistor 168 and terminal B form the input to transistor 152 while resistor 170 is connected to the output of collector 2 of transistor 150. Resistor 172 is connected in feedback arrangement to the output of collector 2 of the transistor 152.

To understand the operation of the device, the following circuit parameters will be assumed: each of the current sources will supply three units of current, the two input resistors 164 and 168 will draw two units of current and all the other current drains will draw one unit of current. In the first stable state, the following conditions are present: terminal A is at logical one, collector 1 of transistor 150 is at logical one, collector 2 of transistor 152 is at logical zero, terminal B and collectors 1 and 2 of transistor 152 are at logical zero. Under these conditions there will be a two unit drain on the source 154 because of collector 2 of transistor 150 and collector 1 of transistor 152. This will leave one unit of current to enter the transistor 150 and hold the collectors in the conducting state. There will be a three unit drain on the source 156 because of the terminal B and collector 2 of transistor 150. This will result in both collectors of transistor 152 being in the nonconducting state.

If now both the terminals A and B are pulsed, bringing the terminal A to logical zero and the terminal B to logical one, there will be one unit of current entering the transistor 152 tending to bring collector 1 of that transistor to logical one. The pulse applied at the terminal A will result in bringing collector 1 of transistor 150 to logical zero. This is the transitional state. At the termination of the pulses, terminal A will again go to logical one. There will initially be a one unit drain to collector 2 of transistor 150. This will leave two units of current to enter the transistor and to bring collector 2 to logical one. The termination of the pulse at terminal B will result in bringing to logical zero the collector 1 of transistor 152, thus providing the requisite one unit drain to hold collector 2 of transistor 150 at logical one. This is the second stable state.

A similar circuit analysis will show that the device will return to its original state by the application at the input terminals of the proper pulses.

From the circuits just described it can readily be comprehended how the invention achieves its principal object of providing faster and more compact switching circuits. The effect of the trigger circuits is to compress more of the switching into a single circuit device thus increasing the effective switching speed and decreasing the number of components required and the attendant wiring connections.

The significance of the invention, when considered in its broad aspect, is apparent when a two-collector sequential circuit of FIG. 5 is compared with its logical equivalent in terms of conventional logic circuits. Such an equivalent would require twelve switching elements including AND, OR, inverter, and Eccles-Jordan flip-flop circuits. The significance, however, is not only that twelve switching elements have been replaced by a single circuit device, but that none of these elements is individually discernible in the two-collector circuit. On the contrary, instead of twelve switching elements, only one switch is utilized with the logic somehow diffused through and fused in the interacting fields controlling the carriers across different junction areas. This has the cohesive effect of combining the separate nature of combinatorial elements and feedback elements into a single phenomena and technology with elements no longer discrete.

While the foregoing description sets forth the principles of the invention in connection with specific apparatus, it is to be understood that this description is made only by way of example and not as a limitation of the scope of the invention as set forth in the objects thereof and in the accompanying claims. For example, it is evident that in the circuits of FIGS. 3 and 5 the feedback loop could be connected to collector 1 rather than collector 2 to achieve a different mode of operation.

What is claimed is:

[1. An electronic trigger circuit comprising a transistor having a base, an emitter and a first and second collector, said transistor being operable to adapt a first stable state in response to one level of emitter current and a second stable state in response to a higher level of emitter current, said first collector being conductive in said first stable state and said second collector being substantially cut-off, and said second collector being conductive in said second stable state and said first collector being substantially cut-off, a current source connected to said emitter, means connected to said current source for controlling the amount of current entering said emitter, means for biasing said collectors.]

2. [An electronic trigger circuit as set forth in claim 1, wherein said means for controlling the current entering said emitter consists] *An electronic trigger circuit comprising a transistor having a base, an emitter and a first and second collector, said transistor having a first stable state in response to one level of emitter current and a second stable state in response to a higher level of emitter current, said first collector being conductive in said first stable state and said second collector being substantially cut-off, and said second collector being conductive in said second stable state and said first collector being substantially cut-off, a current source connected to said emitter, means for biasing said collectors and means connected to said current source for controlling the amount of current entering said emitter, said last mentioned means consisting* of a first and a second current drain, pulsing means coupled to said first and said second current drains for controlling respectively the operation of said drains, feedback means extending from said second collector to said emitter, and a third current drain connected in said feedback means.

3. [An electronic trigger circuit according to claim 1, and also including feedback means comprising a first] *An electronic trigger circuit comprising a transistor having a base, an emitter and a first and second collector, said transistor having a first stable state in response to one level of emitter current and a second stable state in response to a higher level of emitter current, said first collector being conductive in said first stable state and said second collector being substantially cut-off, and said second collector being conductive in said second stable state and said first collector being substantially cut-off, a current source connected to said emitter, means for biasing said collectors and means connected to said current source for controlling the amount of current entering said emitter, a first* feedback connection from said first collector to said emitter and a second feedback connection from said second collector to said emitter; [and wherein] said means for controlling the current entering said emitter comprising a first and a second current drain, pulsing means coupled to said first and said second current drains for controlling the operation thereof, a third current drain coupled to said first feedback connection; and a fourth current drain coupled to said second feedback connection.

4. [An electronic trigger circuit according to claim 1, wherein said current controlling means comprises first,] *An electronic trigger circuit comprising a transistor having a base, an emitter and a first and second collector, said transistor having a first stable state in response to one level of emitter current and a second stable state in response to a higher level of emitter current, said first collector being conductive in said first stable state and said second collector being substantially cut-off, and said second collector being conductive in said second stable state and said first collector being substantially cut-off, a cur-*

*rent source connected to said emitter, means for biasing said collectors and means connected to said current source for controlling the amount of current entering said emitter, said last mentioned means comprising first, second* and third current drains, pulsing means for controlling the operation of said drains, [and a fourth current drain connected in said feedback means, and] feedback means extending from said second collector to said emitter, *and a fourth current drain connected in said feedback means.*

5. An electronic trigger circuit comprising a plurality of transistors connected in cascade, each transistor having a base, an emitter and a first and second collector, a current source connected to each of said emitters, means connected to each of said current sources for controlling the amount of current entering said emitters, means for biasing each of said collectors, each of said transistors *having* [being operable to adopt] a first stable state in response to one level of emitter current and a second stable state in response to a higher level of emitter current, said first collector being conductive in said first stable state and said second collector being substantially cut-off, and said second collector being conductive in said second stable state and said first collector being substantially cut-off, and means for coupling a collector of one transistor to the emitter of the next successive transistor.

6. An electronic trigger circuit according to claim 5, wherein said plurality of transistors comprises a first and second transistor, and said coupling means further comprises means coupling a collector of said second transistor to the emitter of said first transistor.

7. An electronic trigger circuit according to claim 5, wherein said plurality of transistors comprises first, second and third transistors, and said coupling means further comprises means connecting together the emitters of said first, said second and said third transistors.

References Cited by the Examiner

The following references, cited by the Examiner, are of record in the patented file of this patent or the original patent.

UNITED STATES PATENTS

| | | | |
|---|---|---|---|
| 2,992,337 | 6/1961 | Rutz. | |
| 3,047,733 | 7/1962 | Rutz | 307—88.5 |

FOREIGN PATENTS

| | | |
|---|---|---|
| 1,035,779 | 8/1958 | Germany. |

ARTHUR GAUSS, *Primary Examiner.*

J. S. HEYMAN, S. D. MILLER, *Assistant Examiners.*